(12) United States Patent
Frison et al.

(10) Patent No.: US 9,264,161 B2
(45) Date of Patent: Feb. 16, 2016

(54) WIRELESS FIRE SYSTEM WITH IDLE MODE AND GATEWAY REDUNDANCY

(71) Applicant: Honeywell Intrnational Inc., Morristown, NJ (US)

(72) Inventors: Andrea Frison, Monfalcone (IT); Daniel Merli, Trieste (IT); Daniel Polito, Cervignano del Friuli (IT)

(73) Assignee: LIFE SAFETY DISTRIBUTION AG, Hegnau (CH)

( * ) Notice: Subject to any disclaimer, the term of this patent is extended or adjusted under 35 U.S.C. 154(b) by 112 days.

(21) Appl. No.: 14/101,863

(22) Filed: Dec. 10, 2013

(65) Prior Publication Data

US 2015/0163002 A1   Jun. 11, 2015

(51) Int. Cl.

| | |
|---|---|
| H04L 12/26 | (2006.01) |
| H04J 3/06 | (2006.01) |
| H04L 12/66 | (2006.01) |
| H04W 56/00 | (2009.01) |
| H04W 4/00 | (2009.01) |
| H04L 29/08 | (2006.01) |
| H04L 29/14 | (2006.01) |
| G08B 25/00 | (2006.01) |
| H04W 84/18 | (2009.01) |
| H04L 12/28 | (2006.01) |

(52) U.S. Cl.
CPC .............. *H04J 3/0641* (2013.01); *G08B 25/009* (2013.01); *H04J 3/0647* (2013.01); *H04L 12/66* (2013.01); *H04L 67/12* (2013.01); *H04L 69/40* (2013.01); *H04W 4/005* (2013.01); *H04W 56/0015* (2013.01); *H04L 12/2827* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2005/0201340 | A1 | 9/2005 | Wang et al. |
| 2009/0154343 | A1* | 6/2009 | Fitch et al. .................... 370/221 |
| 2011/0258433 | A1* | 10/2011 | Pulini ..................... H04L 63/20 713/153 |
| 2015/0163002 | A1* | 6/2015 | Frison et al. .................. 370/221 |
| 2015/0163758 | A1* | 6/2015 | Frison et al. .................. 370/221 |

FOREIGN PATENT DOCUMENTS

WO   WO 2009/075889 A2   6/2009

OTHER PUBLICATIONS extended European search report for corresponding EP patent application 14194413.2, dated Mar. 23, 2015.

Hwang et al., Enhanced Self-Configuration Scheme for a Robust ZigBee-based Home Automation, IEEE Transactions on Consumer Electronics.

May 1, 2010, pp. 583-590, vol. 56, No. 2, IEEE Service Center, New York, NY, U.S.

* cited by examiner

*Primary Examiner* — Michael J Moore, Jr.

(74) *Attorney, Agent, or Firm* — Husch Blackwell LLP

(57) ABSTRACT

A method and apparatus that includes the steps of providing a plurality of wireless nodes including at least one parent node and at least one child node, a control panel sending instructions to and receiving data from the plurality of nodes through a primary gateway and a wireless subsystem of the gateway, the primary gateway synchronizing the plurality of nodes by periodically transmitting a synchronization signal and one of the plurality of nodes detecting failure of the gateway and transmitting an idle synchronization signal for so long as the one of the plurality of nodes detects failure of the gateway.

18 Claims, 7 Drawing Sheets

WIRELESS FIRE SYSTEM WITH IDLE MODE AND GATEWAY REDUNDANCY

FIELD

The field relates to fire systems and more particularly to fire systems using mesh networks.

BACKGROUND

Fire detection systems are generally known. Such systems are typically based upon the use of a number of fire detectors dispersed throughout a building and at least one warning device that warns occupants of the building to the presence of a fire. While each fire detector could be connected to its own warning device, fire detectors are typically connected to a common monitoring panel. This is useful because of the need to send notice of any detected fire to a central monitoring station.

However, the use of a common monitoring panel requires that a connection be established and maintained between the panel and each fire detector and each warning device. In the past, the connection was established by installing at least two wires between each fire detector and the monitoring panel and between each warning device and the monitoring panel.

More recent systems have relied upon the use of wireless transceivers to reduce the costs of installation. Such systems require a transceiver located in each of the fire detectors, the warning device and the central monitoring panel.

Still other systems have relied upon wireless transceivers within one or more of the sensors to relay signals from other sensors in a mesh network. While these systems work well, they often require signal coordination among the wireless devices that may be kept even if one or more devices on the network are switched off. Accordingly, a need exist for better methods of controlling such systems.

DETAILED DESCRIPTION OF AN ILLUSTRATED EMBODIMENT

Figure 1:
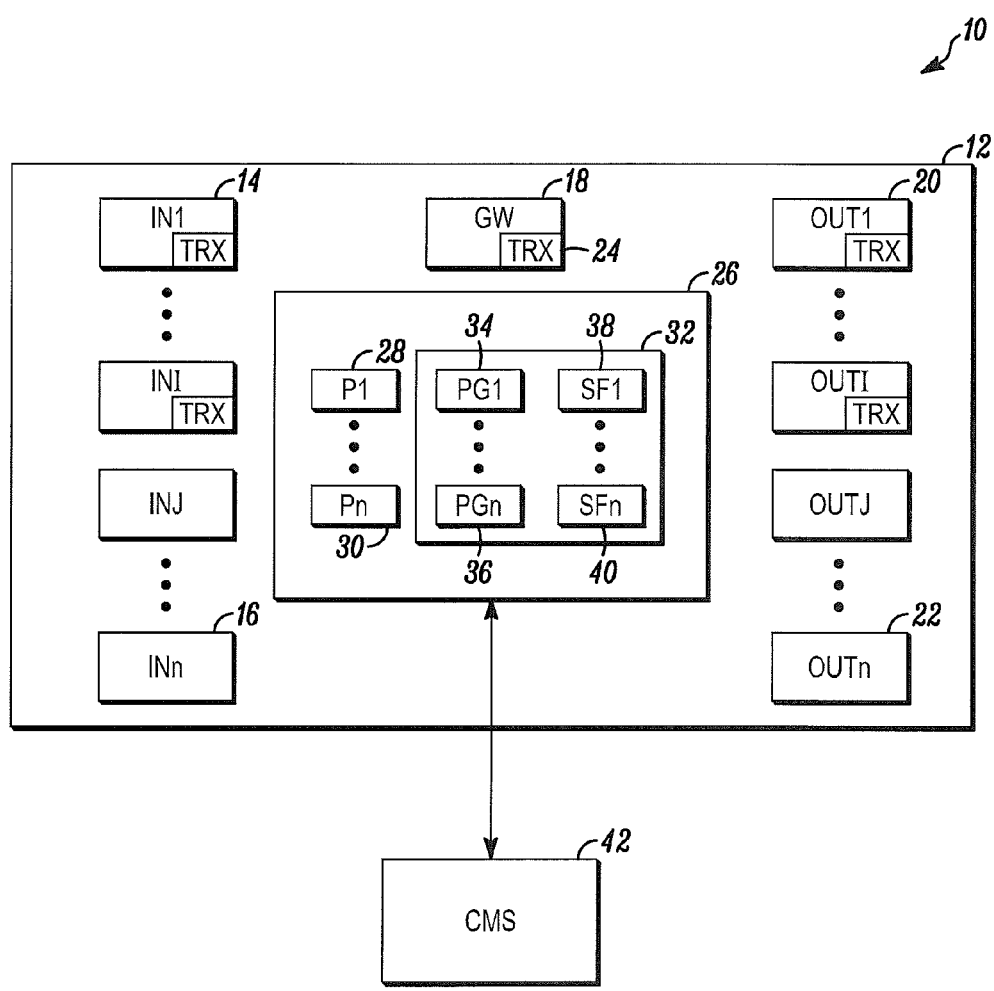
FIG. 1 is a simplified block diagram of a security system in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a simplified block diagram of a security system or more particularly, a fire detection system 10 shown generally in accordance with an illustrated embodiment. Included within the system may be a number of fire input devices 14, 16 used to detect threats such as from fire within a secured area 12. The fire input devices may be scattered throughout the secured area and may each include a fire detector that operates to detect fire by sensing any one or more of a number of different fire-related parameters (e.g., smoke, carbon monoxide, heat, etc.) and a manual call point.

The fire system may also include a number of different warning devices 20, 22 intended to be activated in the event of fire to warn people within the secured area. The warning devices may be any type of audio and/or visual device that attracts attention and announces the existence of a fire.

Also included within the secured area may be a control panel that monitors the sensors for indications of fire. In this regard, a wireless transceiver 24 located within at least some or all of the devices may be used to transmit notification of the detection of a fire to a corresponding transceiver within the alarm panel. Upon detecting a fire, the control panel may activate one or more of the warning devices and send an alarm message indicating a fire to a central monitoring station 26.

Included within the control panel may be one or more processor apparatus (processors) 28, 30 each operating under control of one or more computer programs 34, 36 loaded from a non-transient computer readable medium (memory) 32. As used herein, reference to a step performed by a computer program is also reference to the processor that executed that step.

In this regard, an alarm processor within the control panel may monitor a status of each of the input devices. Upon detecting activation of any of the inputs, the alarm processor may activate one or more of the warning devices and send an alarm message to the central monitoring station.

Figure 2:
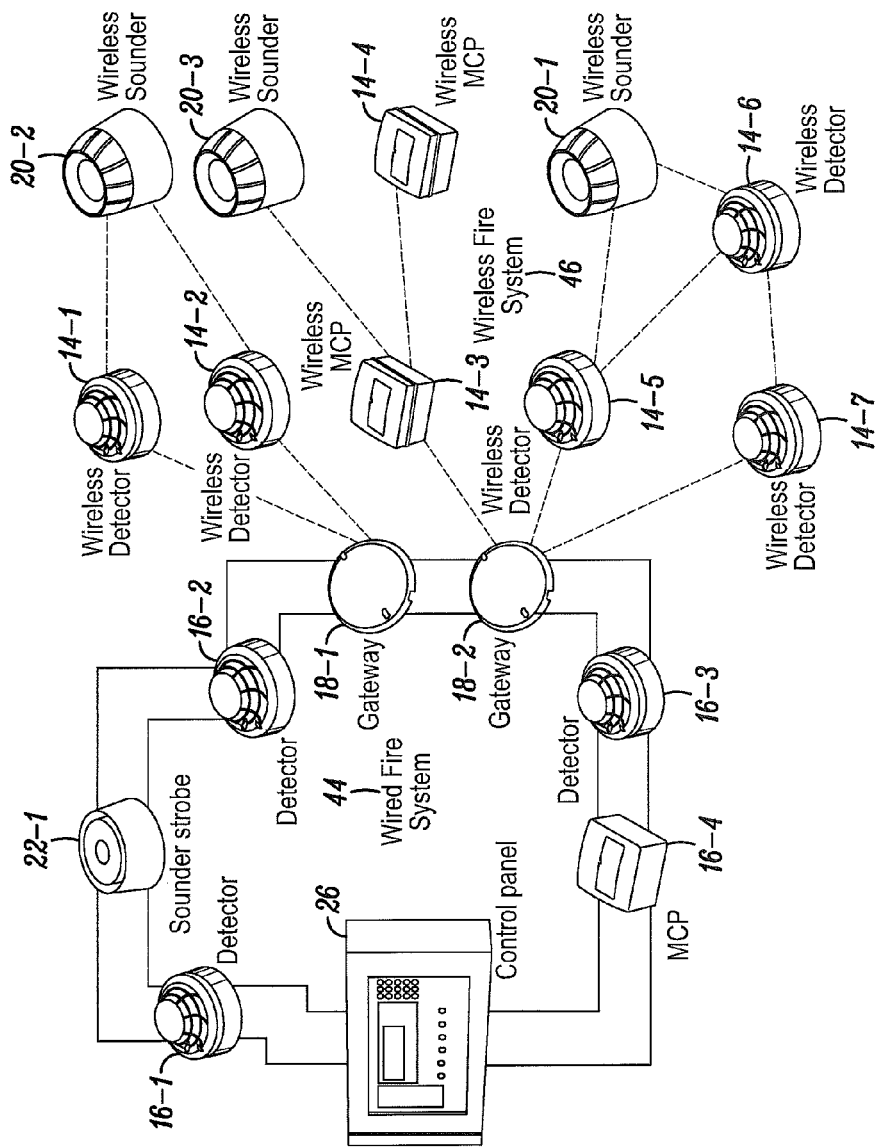
FIG. 2 is a more detailed example of the security system of FIG. 1.

FIG. 2 is a more detailed example of the fire detection system of FIG. 1. As shown in FIG. 2, the control panel may be coupled to the sensors (14, 16) and warning devices (20, 22) via a number of communication mediums 44, 46. For example, the control panel may be connected to at least some sensors 16-1, 16-2, 16-3 and manual call point 16-4 via a wired communication loop 44, 42 and a corresponding communication module 38. Similarly, the control panel may be coupled to other sensors 14-1, 14-2, 14-5, 14-6, 14-7 and manual call points 14-3, 14-4, via the communication loop 44, one or more gateways 18 (e.g., 18-1, 18-2) and a mesh network 46.

In this regard, the gateways 18 may operate to translate device coding (e.g., addresses) from a radio frequency (rf) protocol used within the radio domain to a loop protocol that, in turn, incorporates communication loop addresses recognized by the control panel on the communication loop. In this regard, the protocol used by the mesh network may be based upon any of a number of different rf protocols (e.g., the Cascading Wave Communication protocol developed by Honeywell, Inc.). This rf protocol provides a reliable deterministic redundant communication system that operates without congesting the network of FIG. 2 in high traffic scenarios.

In general, the mesh 46 forms a communication network based upon a series of parent/child relationships. The basic network element is called a node and the network root element (node 0) is referred to as the gateway or master node 18. Each node can be connected to geographically adjacent nodes via full duplex links, so that each device is able to manage communications in the direction of both network boundaries (e.g., from its children to the root and vice versa).

Each father node receives data from its children, and forwards such data packets along with its own information back to the gateway. Each child receives data from its fathers and forwards such data packets to its descendants. In this way, every node can also be considered a repeater.

Each child can have up to two fathers, to guarantee redundancy and alternative paths to complete the data transmission to and from the gateway. In this way even if a node fails, there is always another one able to complete the communication chain. Each node, but the gateway, can have up to 4 children. The gateway can have a number of children equal to the maximum number of nodes present on the network.

Figure 3:
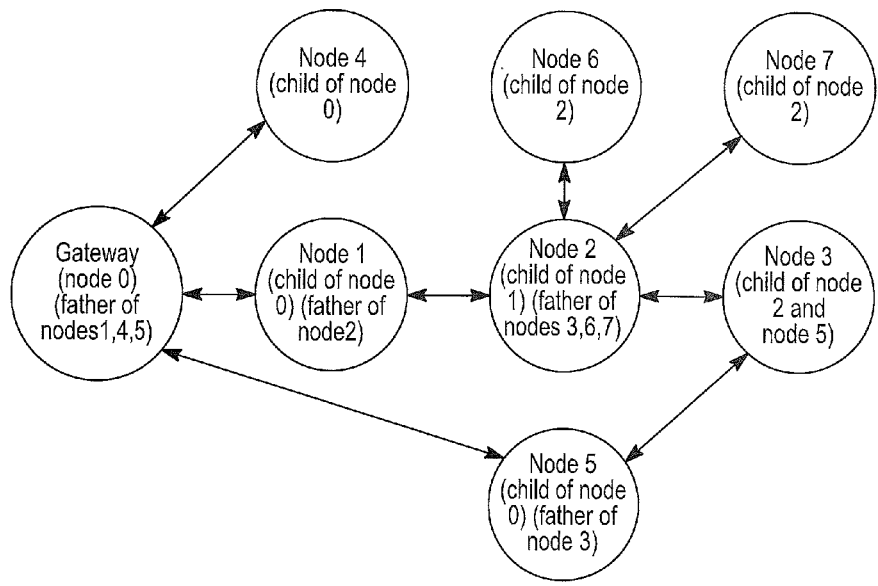
FIG. 3 depicts the parent-child relationship of the nodes of FIG. 2.

A simplified arrangement of the mesh network 46 is shown in FIG. 3. FIG. 3 highlights the father-child links between the nodes 14, 18, 20.

To avoid message collisions, the nodes in FIG. 2 may operate under a time division multiple access (TDMA) format. In this regard, each node may be assigned to operate within a predetermined slot of a repeating frame and superframe.

Figure 4:
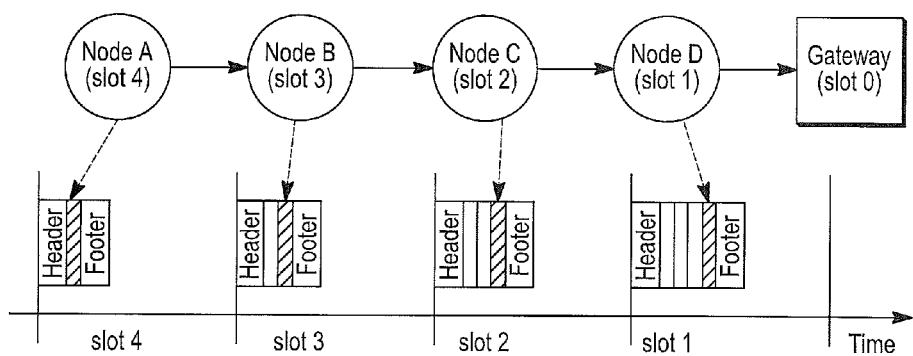
FIG. 4 depicts upstream packet usage by the nodes of FIG. 2.

In general, the communication protocol of the devices 14, 18, 20 operate under a principle called data aggregation. FIG. 4 depicts an example of this principle. FIG. 4 shows a gateway and 4 nodes, where each node transmits its data to the gateway, using the TDMA format and data aggregation.

As shown in FIG. 4, the packet transmitted by "node A" is located on the boundary farthest from the gateway. Node A transmits a packet first where the packet contains only its own data. When the packet is received by "node B", a processor of node B appends its data, if any, at the end of the packet (prior to the footer) and forwards the packet to its father node. When the packet reaches the gateway, it contains data of all 4 nodes.

To enable the efficient aggregation of data without increasing message latency, the transmit slots Tx used by the TDM mesh network are allocated in order of distance from the gateway in such a way as to have children nodes always transmit before their fathers. Thus, a child node's data is always available at the father node before and during the father's Tx slot. This allows a processor of the father to aggregate its own data with that received from its child node and transmit the data together in a single packet. In FIG. 4, network node B is the father of node A, node C is the father of node B, and so on.

As a result of aggregation, the transmission of the data of the four nodes of FIG. 4 only needs 4 slots as shown in FIG. 4. In the case of a 32 node network, it would take only 32 slots for the data of all nodes to reach the gateway and therefore to be available to the control panel.

Figure 5:
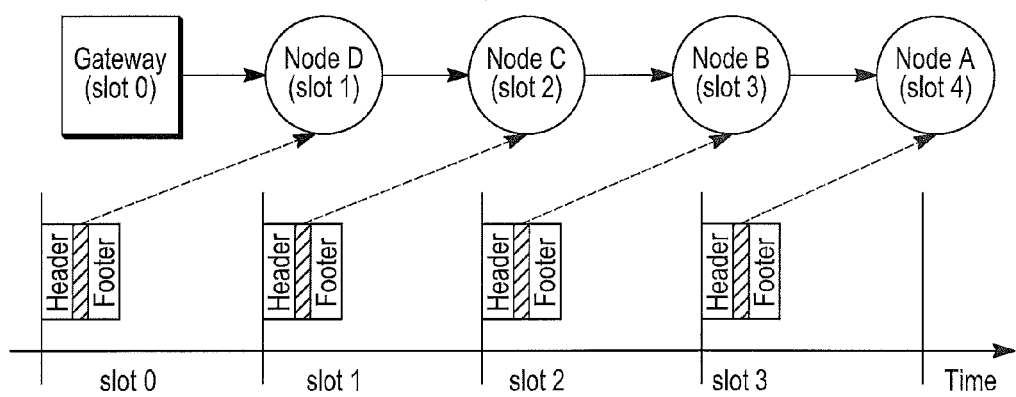
FIG. 5 depicts downstream packet usage by the nodes of FIG. 2.

Using the same protocol, the control panel can also send data to each of the network nodes as shown in FIG. 5. In this case, the aggregated message is received by the devices in accordance with its status in the father-child hierarchy. Thus node D receives the aggregated packet during the gateway's transmission slot, while node A receives the message during node B's transmission slot. In each case, a processor of the father node strips off the data intended for the father before forwarding the remainder of the data to its respective child node.

During registration, each node may include programming to follow a predetermined set of rules related to registration as parent and child. First (as noted above), the gateway can only have a maximum of 32 child nodes. Any node that is not a gateway can only have a maximum of 4 children. A node that is not a gateway can only have a maximum of two fathers. The slot number of a child is always greater than the slot number of a father (the effect of this is that a node cannot simultaneously be a father and child of the same node).

Figure 7:
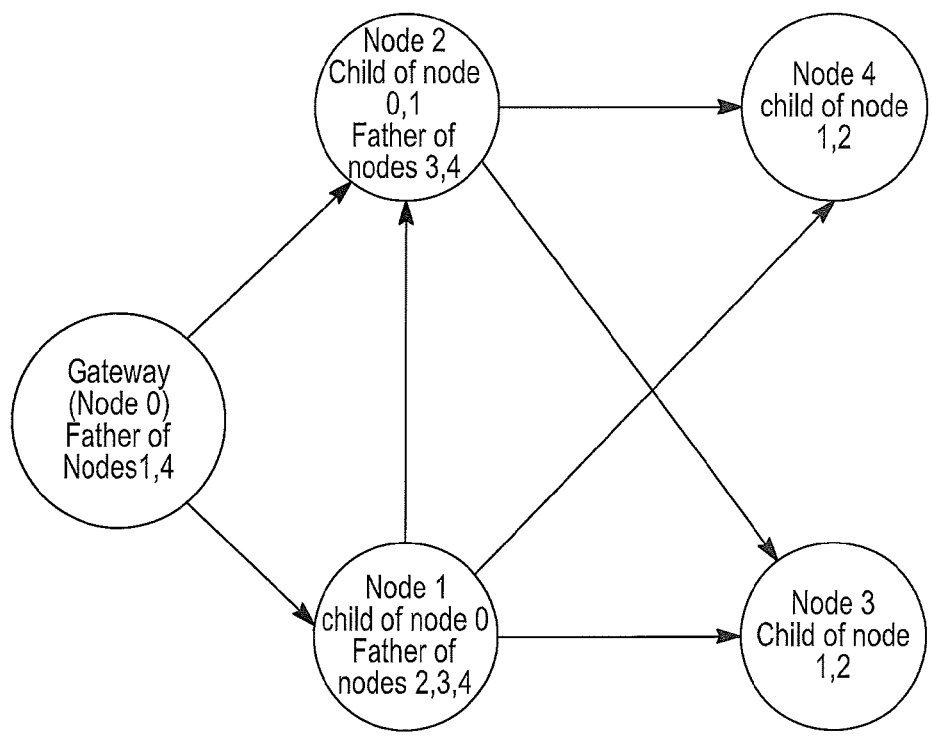
FIG. 7 depicts an arrangement of parent-child nodes that may be used by the system of FIG. 1.

FIG. 7 depicts a possible arrangement of nodes. As may be noted, the gateway is node 0 and has two children (i.e., node 1 and node 2).

Once the links between the gateway and nodes have been established, it is necessary to maintain the synchronism among the nodes in order to avoid collisions. This may be accomplished via a periodically transmitted synchronization message broadcast by the gateway.

Figure 6:
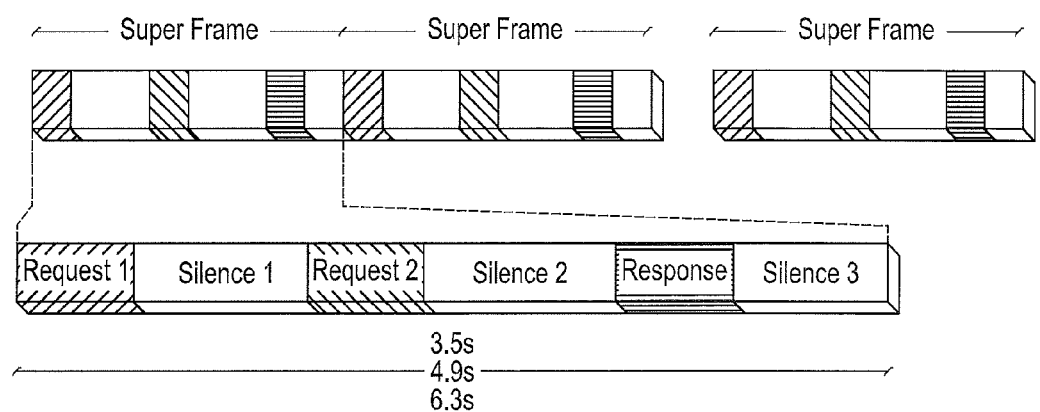
FIG. 6 depicts a super frame that may be used by the system of FIG. 1.

In addition to maintaining synchronism, the synchronization message may also provide the nodes with a basis for identifying the relationship between each slot and its location within the frame and super frame. In this regard, each super frame may consist of 6 phases including two request phases, where data are sent from nodes to the gateway, one response phase, where data goes from the gateway to the nodes, and three silent phases, where no data are sent through the media. Each request and response phase may be separated by a silent phase as is shown in FIG. 6.

During each request phase, nodes allocated to a higher slot index number transmit first and during the response phase, nodes allocated to a lower slot index number transmit first. For example, FIG. 4 shows that node A has a slot index number of 5 so it transmits first in the request phase. Similarly, FIG. 5 shows that node D has a slot index number of 1, so it transmits first to other nodes in the response phase.

During normal operation, the network stays synchronized via the periodically transmitted broadcast message originating from the gateway and forwarded by each father node to its child nodes. Each of the nodes of the network remains active for receipt of the broadcast synchronization message or other messages, but may go to sleep between messages. For example, each of the nodes will wake up on the appropriate slot only if there is the possibility of receiving a message from a father or if it needs to sends a message to its children, thereby minimizing power consumption. By going to sleep (i.e. shutting down) during periods of inactivity, the average power consumption of each node is in the order of tens of micro amps.

When the gateway is powered down (e.g., for maintenance reasons), each of the nodes of conventional networks detects the absence of synchronization messages and enters a special working mode (called a Recovery Mode) where each node tries to re-establish communication with the gateway. The Recovery Mode requires the continuous operation of each node for the reception and transmission of messages and involves a great deal of power consumption. The Recovery Mode continues until synchronization messages are again resumed by the gateway resulting in the consumption of tens of milliamps, drastically reducing the battery life of each node. In many cases, the battery of each node may be exhausted in a few days if the gateway does not resume operation.

Figure 8:
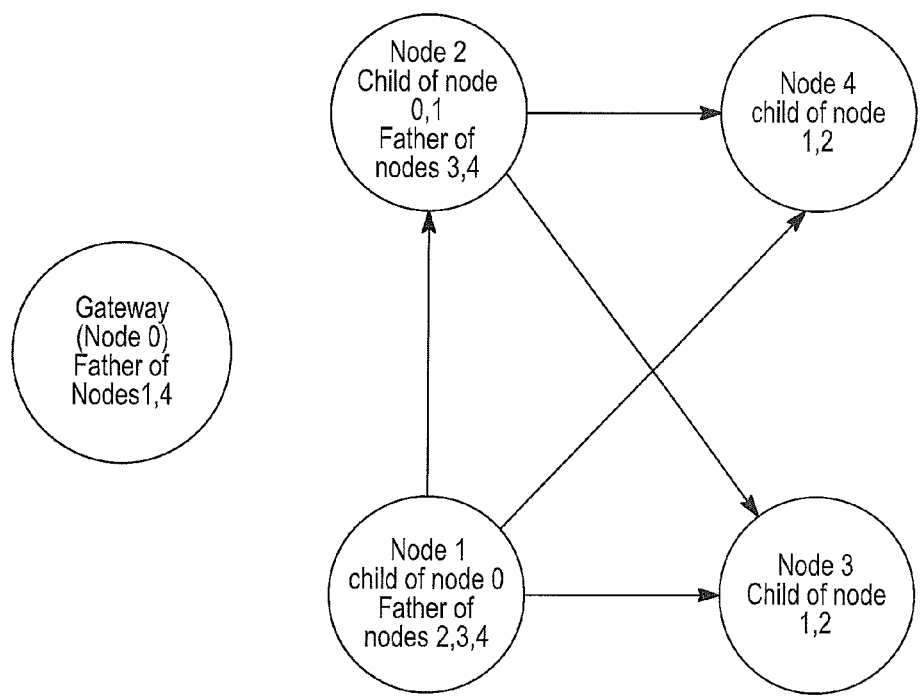
FIG. 8 depicts the arrangement of FIG. 7 upon failure of the primary gateway.

Under an illustrated embodiment, one or more of the nodes includes an idle control program executing on a processor of the node and that monitors the system for synchronization messages. For example, the idle detection program executes within the node assigned to slot 1 of the mesh network. In this case, the node assigned to slot 1 (node 1) is an ancestor of all the other nodes meaning that through its children and other descendants it is connected with all the nodes of the network. Since the node assigned to slot 1 is the ancestor of all of the other nodes, when the idle control program of node 1 detects that the gateway is inoperative, the idle control program begins sending a special synchronization message (idle synchronization message as shown in FIG. 8) to its descendants. This message is received by all of the other nodes (as described above) thereby maintaining the network synchronization. A component of the idle control program executing within node 1 and each of the child nodes inhibits all other functions of node 1 and the child nodes (e.g., alarm communications) while still allowing node 1 to provide synchronization to all of the network elements so long as the gateway is down. This node-driven low power mode may be referred to as the "idle mode." In this way all of the nodes will sink the same current as if the gateway were operating properly.

When the gateway returns to normal operation, the gateway searches for an existing synchronization message from network elements, typically node 1. Once received, the gateway synchronizes with the idle synchronization message and begins sending an over-riding "official" synchronization message. In response, node 1 detects the synchronization message from the gateway (its father) and stops sending the idle synchronization message. Instead, node 1 begins forwarding the gateway synchronization message. Each of the child nodes detects the gateway synchronization message and switches from the idle mode to the normal working mode.

Using this method, the nodes adapt to the shutdown of the gateway by switching to the idle mode. In this state, the gateway can stay unpowered for days (or more) without affecting battery life of the nodes.

Under another illustrated embodiment, a backup gateway of the primary gateway may be provided. The backup gateway may be dictated by fire legislation (or code of practice) or simply to increase reliability. The problem with a backup gateway, however, is to provide a mechanism to activate and deactivate the backup gateway in a manner that is transparent to normal operation. Under the illustrated embodiment, activation and deactivation of the backup gateway is accomplished by detecting the idle synchronization messages that are transmitted from node 1 in the event of failure of the primary gateway.

The backup gateway is programmed with the same software and configuration as the primary gateway. There are no differences between the primary and backup gateways except that the backup gateway includes a backup control program.

When initially activated, the command to start network enrollment will be sent to only one gateway (the primary gateway). The backup gateway will initialize in a continuous transmit/receive mode, will synchronize with the network, and then will enter a sleep mode. The backup gateway will periodically reactivate (wake up from time to time), resynchronize (check its synchronization), and check the status of the network.

If the status of the network is normal, the backup gateway will remain inactive except to maintain synchronization with the synchronization message from the primary gateway. Alternatively, if the backup gateway detects the idle synchronization message from node 1, then the backup gateway assumes the role of the primary gateway thereby taking control of the network as if it were the primary father node.

The backup gateway may remain in full control of the network until the primary gateway is again returned to normal operation. In this case, the primary gateway may synchronize with the backup gateway and begin sending the official synchronization message of the primary gateway over-riding the synchronization message of the backup gateway. The backup gateway may detect the over-riding synchronization from the primary gateway and resume its backup state.

In general the system incorporates a method that includes the steps of providing a plurality of wireless nodes including at least one parent node and at least one child node, a control panel sending instructions to and receiving data from the plurality of nodes through a primary gateway and a wireless subsystem of the gateway, the primary gateway synchronizing the plurality of nodes by periodically transmitting a synchronization signal, and one of the plurality of nodes detecting failure of the gateway and transmitting an idle synchronization signal for so long as the one of the plurality of nodes detects failure of the gateway.

Alternatively, the system includes a plurality of wireless nodes including at least one parent node and at least one child node, a primary gateway, and a control panel that sends instructions to and receives data from the plurality of nodes through the primary gateway and a wireless subsystem of the gateway, wherein the primary gateway synchronizes the plurality of nodes by periodically transmitting a synchronization signal, and wherein one of the plurality of nodes detects failure of the gateway and transmits an idle synchronization signal for so long as the one of the plurality of nodes detects failure of the gateway.

Alternatively, the system includes a plurality of wireless nodes including at least one parent node and at least one child node, a primary gateway that synchronizes each of the plurality of wireless nodes to the primary gateway, a control panel that sends instructions to and receives data from the plurality of nodes through the primary gateway and a wireless subsystem of the gateway, wherein one of the plurality of nodes detects failure of the gateway and transmits an idle synchronization signal for so long as the one of the plurality of nodes detects failure of the gateway, and a backup gateway that synchronizes the plurality of nodes and that exchanges messages between the plurality of wireless nodes in place of the primary gateway upon detection of the idle synchronization signal.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
   providing a plurality of wireless nodes including at least one parent node and at least one child node;
   a control panel sending instructions to and receiving data from the plurality of nodes through a wired connection with a primary gateway and a wireless subsystem of the primary gateway;
   the primary gateway synchronizing the plurality of nodes into a network by periodically transmitting a synchronization signal;
   one of the plurality of nodes detecting failure of the primary gateway and transmitting an idle mode synchronization signal for so long as the one of the plurality of nodes detects failure of the primary gateway;
   a backup gateway wired to the control panel initializing and synchronizing with the network and then entering a sleep mode;
   the backup gateway detecting the idle mode synchronization signal from the one of the plurality of nodes and assuming a role of the primary gateway; and
   upon detecting an over-riding synchronization signal from the primary gateway, the backup gateway resuming its backup state, wherein there are no differences between the primary and backup gateways except that the backup gateway includes a backup control program.

2. The method as in claim 1 further comprising the idle mode synchronization signal inhibiting message traffic from the other of the plurality of nodes.

3. The method as in claim 1 further comprising the backup gateway synchronizing the plurality of nodes by transmitting a second synchronization signal.

4. The method as in claim 3 further comprising the one node detecting the second synchronization signal from the backup gateway and synchronizing to the backup gateway.

5. The method as in claim 4 further comprising the backup gateway exchanging messages between at least some of the plurality of nodes and the control panel.

6. The method as in claim 1 wherein the one node further comprises a child node directly coupled to the one node.

7. The method as in claim 1 further comprising the plurality of wireless nodes arranging themselves into a mesh network.

8. The method as in claim 1 further comprising the plurality of nodes communicating with the primary gateway under a time division multiplex (TDM) format.

9. The method as in claim 1 wherein the plurality of nodes and the primary gateway operate as a security system.

10. The method as in claim 1 further comprising at least some of the plurality of nodes detecting a fire and reporting the detection to the control panel through the primary gateway.

11. An apparatus comprising:
a plurality of wireless nodes including at least one parent node and at least one child node;
a primary gateway;
a control panel having a wired connection with the primary gateway, wherein the control panel sends instructions to and receives data from the plurality of nodes through the primary gateway and a wireless subsystem of the primary gateway, wherein the primary gateway synchronizes the plurality of nodes into a network by periodically transmitting a synchronization signal, and wherein one of the plurality of nodes detects failure of the primary gateway and transmits an idle mode synchronization signal for so long as the one of the plurality of nodes detects failure of the primary gateway; and
a backup gateway wired to the control panel wherein there are no differences between the primary and backup gateways except that the backup gateway includes a backup control program, wherein the backup gateway initializes and synchronizes with the network and then enters a sleep mode, wherein, upon detecting the idle mode synchronization signal from the one of the plurality of nodes, the backup gateway assumes a role of the primary gateway, and wherein, upon detecting an over-riding synchronization signal from the primary gateway, the backup gateway resumes its backup state.

12. The apparatus as in claim 11 further comprising a processor of each of the plurality of wireless nodes that inhibits message traffic from the node.

13. The apparatus as in claim 11 further comprising a processor of the backup gateway that synchronizes the plurality of nodes by transmitting a second synchronization signal.

14. The apparatus as in claim 13 further comprising a processor of the one node that detects the second synchronization signal from the backup gateway and synchronizes to the backup gateway.

15. The apparatus as in claim 14 further comprising a processor of the backup gateway that exchanges messages between at least some of the plurality of nodes and the control panel.

16. The apparatus as in claim 11 wherein the one node further comprises a directly coupled child node of the primary gateway.

17. The apparatus as in claim 11 arranged into a mesh network.

18. An apparatus comprising:
a plurality of wireless nodes of a mesh network including at least one parent node and at least one child node;
a primary gateway that synchronizes each of the plurality of wireless nodes to the primary gateway;
a control panel wired to the primary gateway, wherein the control panel sends instructions to and receives data from the plurality of nodes through the primary gateway and a wireless subsystem of the primary gateway, and wherein one of the plurality of nodes detects failure of the primary gateway and transmits an idle mode synchronization signal for so long as the one of the plurality of nodes detects failure of the primary gateway; and
a backup gateway wired to the control panel, wherein there are no differences between the primary and backup gateways except that the backup gateway includes a backup control program, wherein the backup gateway synchronizes the plurality of nodes and exchanges messages between the plurality of wireless nodes in place of the primary gateway upon detection of the idle mode synchronization signal from the one of the plurality of nodes, and wherein, upon detecting an over-riding synchronization signal from the primary gateway, the backup gateway resumes its backup state.

* * * * *